United States Patent Office 3,400,391
Patented Sept. 3, 1968

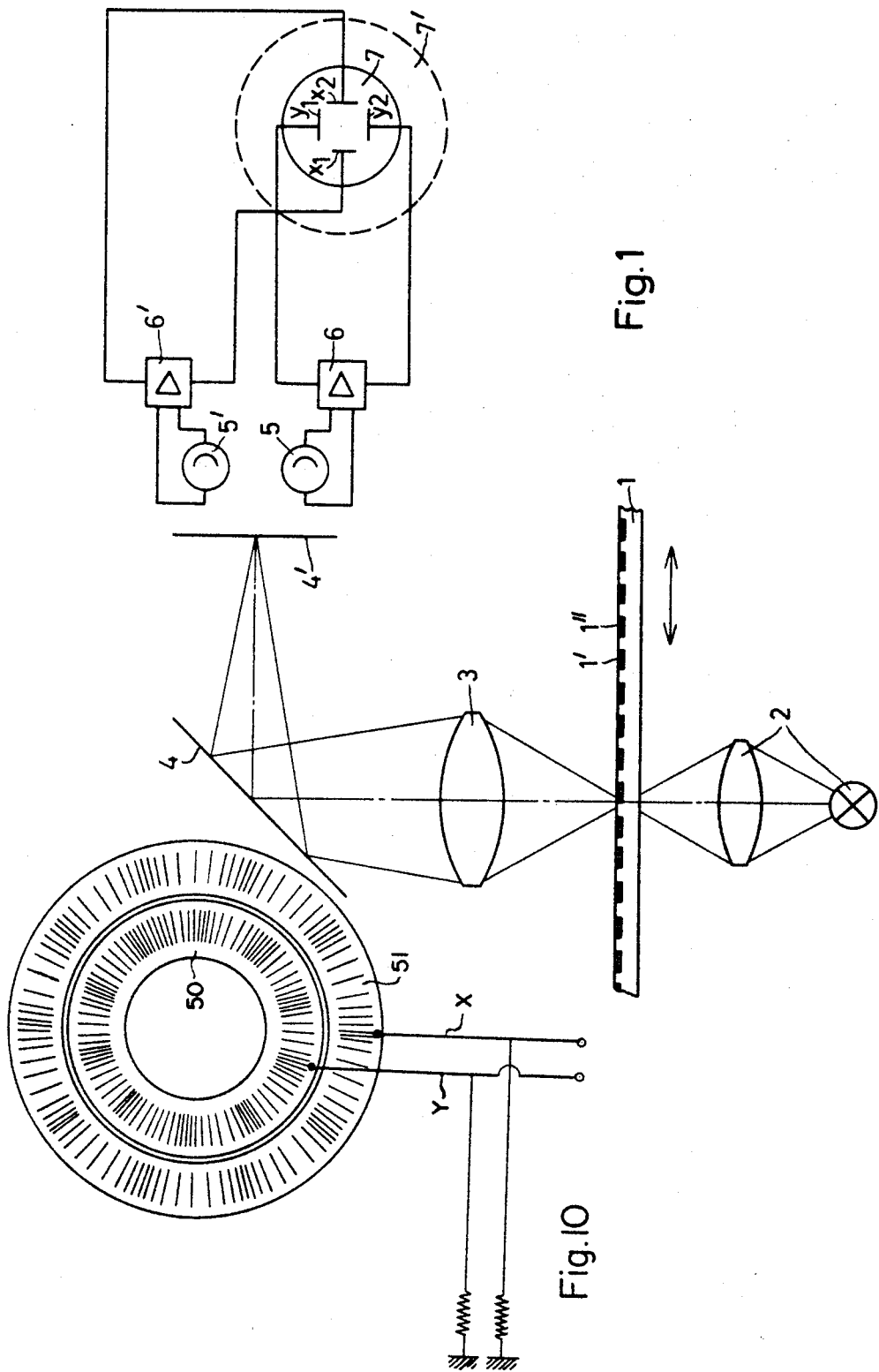

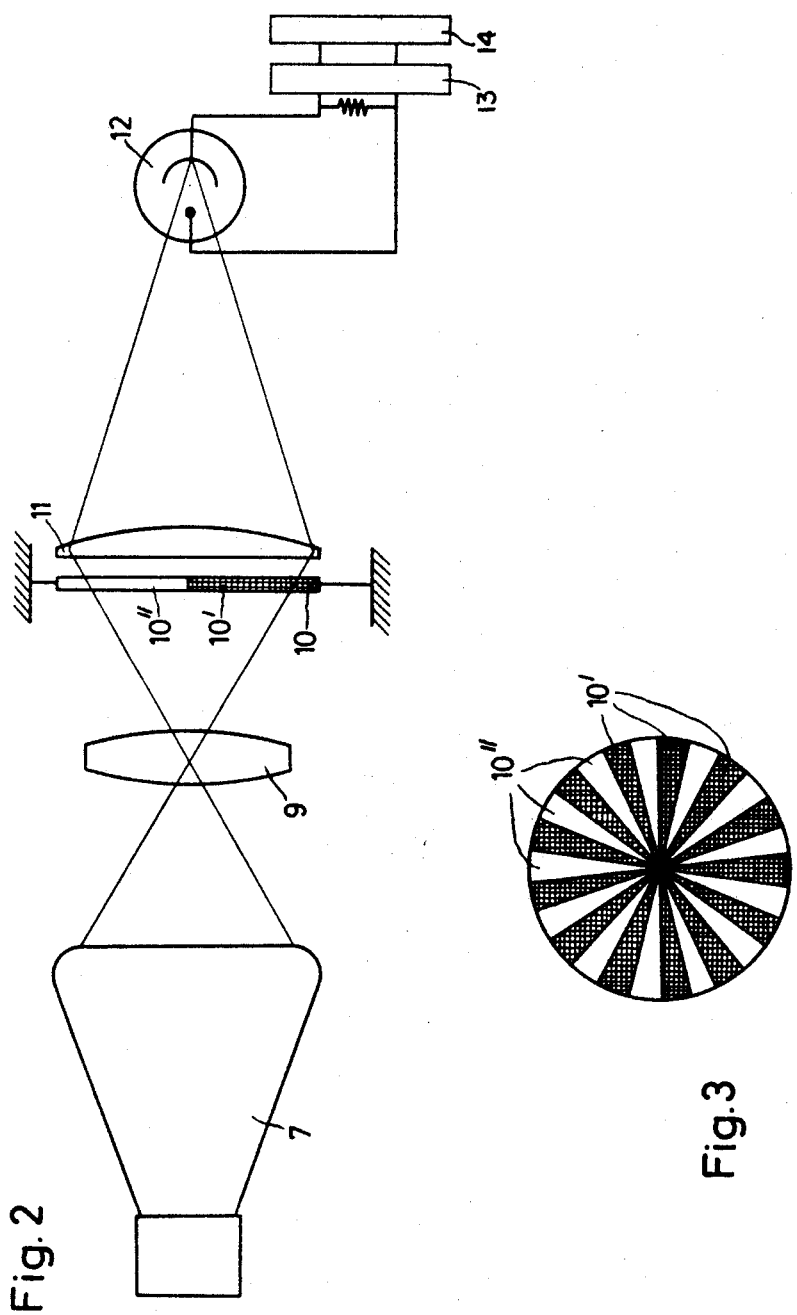

3,400,391
INTERPOLATION DEVICE
Kurt Räntsch, Heidenheim, Wurttemberg, and Otto Trötscher, Wurttemberg, Germany, assignors to Carl Zeiss, Wurttemberg, Germany, a corporation of Germany
Filed Oct. 29, 1964, Ser. No. 407,329
Claims priority, application Germany, Oct. 30, 1963, Z 10,436
13 Claims. (Cl. 340—347)

The invention relates to an interpolation device for the digital interpolation of measuring values which are furnished by length or angle measuring instruments.

It is known in such devices to move a measure embodiment relative to two scanning elements which furnish electric signals and to design this signal transmitting system or to arrange it, respectively, in such a manner that at a movement of the measure embodiment there are produced two signal sequences which are phase displaced by 90° with respect to each other. These signal sequences may be transformed into digital measurement values and/or may be used directly for the control of machine tools. The phase displacement of the signal sequences in the known devices has the purpose to make a forward and a backward counting possible.

In order to meet the increased accuracy requirements of such devices, they must be equipped to register also very small movements of the measure embodiment. This may be achieved by a very fine subdivision of the measure embodiment. Such measure embodiments are, however, structurally rather involved and costly in their manufacture. It has therefore already been suggested to multiply the individual signals by And/Or circuits in conjunction with Schmitt-triggers so that an interpolation of the scale intervals occurs. However, with the known devices of this kind the individual signals can at most be quadrupled, whereas the present invention aims at a substantially finer interpolation.

It is the object of the invention to provide a sensitive interpolation between two scale lines or the signals corresponding thereto, respectively, in that for example a photo electric signal emitter is connected to the deflecting systems of a cathode ray tube so that as a result of the phase displacement of the two signals by 90° a closed orbit of the electron beam is produced the length of which corresponds to a signal period; further, in that for the subdivision of said orbit or an optical image of the same screen elements are provided. If for instance the first signal sequence shows a sine wave, the second signal sequence will have a cosine wave, and the cathode ray revolves in a circular path provided the amplitudes of the sine and cosine waves are equally large.

Such a device produces secondary signals or impulses which may be used for triggering automatic counting or control operations. If, for example, a screen plate with one hundred equal, alternately dark and light zones is used, a 0.01 mm. scale will already permit to count steps which are no longer than 0.1 µm.

The screen plate subdividing the orbit of the electron beam in the cathode ray tube may be arranged directly on the fluorescent screen of the tube, or it may be stationed in a picture plane of a projector which projects the fluorescent screen of the cathode ray tube and may be combined with a further projection lens which projects a reduced image of the screen plate, together with the image of the luminous path of the electron beam produced thereon, on the photo cathode of a photoelectric cell on which consequently periodic light impulses show up. The impulses may be counted by an electronic counter which is arranged and connected at the exit of the photo-electric cell and which in addition may be associated with a wave form generator.

An even simpler device is arrived at if a screen plate is used which has electrically conducting screen elements and is directly introduced in the electron beam of the cathode ray tube as a stationary receiving surface in place of the fluorescent screen. In back of the screening elements is provided a grounded receiving surface which destroys the electrons not received by the screen elements. In this case the screen elements produce directly voltage impulses which may be counted. It is also possible to assign to the screen elements directly the cathodes of number indicating tubes arranged in series so that they will directly indicate the digits.

As to the shape of the screening plate, it has been found most advantageous to choose a sequence of radial sectors which are alternately pervious to light and impervious to light, or are electrically conductive and non-conductive, respectively, so that the influence of the amplitudes and phase variations of the primary signals may be reduced a good deal.

In a further embodiment of the invention the screen elements may be arranged in a plurality of circular zones. In this case it is expedient to have the electron beam oscillate in radial direction so that it may play over the zones. In order to include all elements of the various ring zones, a diffused projection of the electron beam may be helpful too. In this embodiment the screen plate may also comprise code following screen elements which are alternately pervious and impervious to light, or conductive and non-conductive, respectively.

The arrangement of the screen elements in concentric circles makes it further possible to so displace the screen elements with respect to each other that the impulses supplied by the zones are phase displaced by 90° with respect to each other, so that a prefix correct impulse counting may follow.

The arrangement of the screen elements in concentric zones makes it possible to displace the screen elements relatively to one another in such a manner that the signals produced by these zones are phase displaced about an angle of 90° so that an impulse counting means may be connected thereto.

In a further development of the invention, the impulses may be counted correctly with respect to their prefixes in that several screen plates are arranged in series and the disc adjacent the cathode may be formed as a screen diaphragm, for instance with a penetration capacity of 50%.

If the screens are used to directly indicate digitally the position of the electron beam, it may be advantageous to provide a grid screen having ten fields closely spaced, and furthermore an additional grid for receiving the penetrated rays and having for instance 100 segments. In this case the grid screen indicates the first interpolation place and the auxiliary screen the second place. It is also possible to arrange the two screens concentrically to each other, whereby the grid screen may be replaced by a regular screen.

According to another embodiment of the invention, it is also possible to arrange a series of devices of the type described in a cascade-like manner one after the other when particularly difficult interpolation problems are to be solved. In such a case several screen plates are provided of which at least one is constructed as a grid screen which in dependence of the polar angle of the electron beam produces a voltage function. If the screen plates are arranged in series, the plate behind the grid screen will produce a complementary voltage function. Both functions are usable for controlling the electron beam of the following cathode ray tube. The grid screens may also be arranged concentrically. The penetrated rays may be used for the indication of the position of the electron beam as a digit value, for instance as the first interpolation decade.

If the grid screens correspond to a periodical function, for example a sine or cosine function, and these functions are repeated periodically at the orbit of the electron beam, then the electron beam in the tube following the grid screen circles in a corresponding ratio. Thereby it is possible to obtain a finer interpolation.

The invention will now be described in more detail with reference to the accompanying drawings, in which:

FIG. 1 illustrates diagrammatically the interpolation device up to the input of the cathode ray tube;

FIG. 2 is a diagrammatic illustration of the device with an optical presentation of the closed electron beam path on an optical screen;

FIG. 3 is an elevation view of a screen with sectors of uniform angular size;

FIG. 10 illustrates diagrammatically still another embodiment of the device of the invention.

Figure 4:
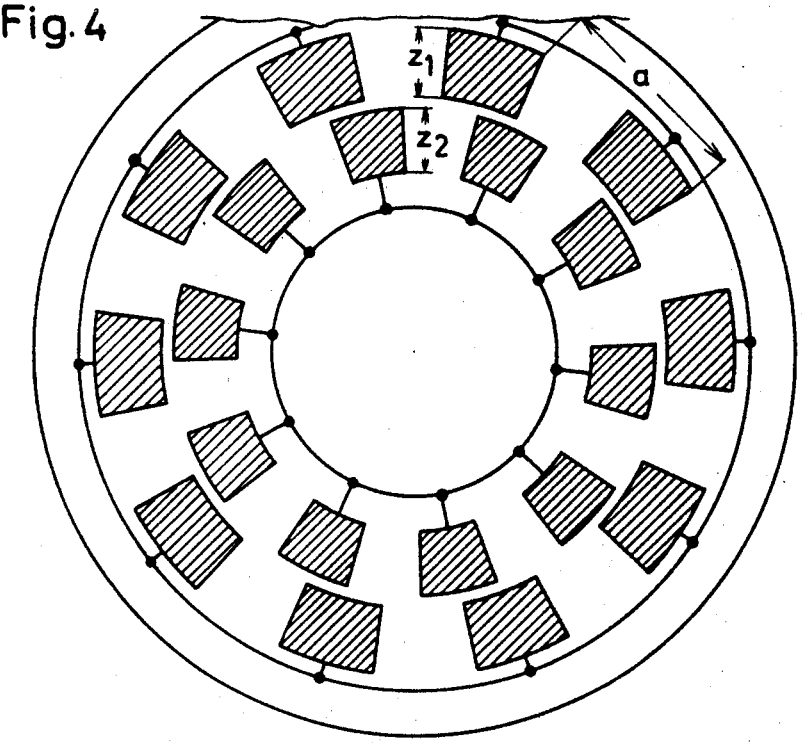
FIG. 4 illustrates a portion of a screen disc with two concentric zones.

Referring to FIG. 1, a laterally displaceable scale 1 having scale intervals 1', 1", and so forth, is applied to a light transmissive base. The scale is illuminated by an illumination device 2 comprising a light source and a condenser and is projected by a lens 3 and a deflecting mirror 4 first onto a scanning grid 4' which in known manner is so constructed that the two photoelectric cells 5, 5' arranged behind the scanning grid 4' at a movement of the scale 1 furnish signals which are phase displaced by 90° with respect to each other. Such a scanning grid may consist for example of two partial grids which are offset to each other by one quarter of the grid constant, which latter corresponds to the width of the scale image projected thereon. The primary signals emitted by the photoelectric cells 5, 5' are amplified by the amplifiers 6, 6' and are transferred to the deflecting plates $X_1$, $X_2$ and $Y_1$, $Y_2$, respectively, of a cathode ray tube 7. If the signals phase displaced by 90° show a sine wave and if their amplitudes are of like magnitude, the electron beam of the cathode ray tube 7 will perform a circular orbit on the picture screen 7' which is oriented vertically to the tube axis.

As is illustrated schematically in FIG. 2, the annular luminous image produced on the fluorescent screen is projected by the lens 9 onto the stationary screen 10 and thereupon the lens 9 is imaged by the field lens 11 on the photoelectric cell 12. The screen 10 is provided with light transmissive and opaque sections 10 and 10" and, as shown in FIG. 3, has the shape of a radial screen in order to reduce the amplitude and phase variations of the primary signals.

While the above described screen is provided with uniformly large sections of constant light transmissivity—alternating completely impervious and completely pervious—it is also possible to employ a screen the light transmissivity of which continually changes periodically in the manner of a sky filter. The transmissivity is so varied that in dependence of the polar angle the light stream transmitted follows a periodical function, preferably a sine function.

When the scanning grid 4' (FIG. 1) scans a complete scale interval, the electron beam upon a respective movement of the scale 1 makes a complete orbit. The luminous trace of the electron beam which appears on the screen 10 moves successively alternatingly over the light pervious and light impervious sections of the stationary screen disc. The light impulses generated in this manner are converted by the photoelectric cell 12 into electric impulses which after a conversion by the wave form generator 13 for example may be conducted to a counter 14.

As mentioned before, the embodiment of a screen disc according to the invention illustrated in FIG. 3 divides the circular path of the electron beam in uniformly large sections. Since a complete orbit of the electron beam corresponds to a complete scale interval, it follows that this scale interval too is accordingly subdivided. If for instance the screen disc is divided into one hundred parts having each uniformly large dark and bright zones, scale steps of no more than 0.1 $\mu$m. length can be counted on a 0.01 mm. scale.

FIG. 4 shows a different embodiment of a screen disc according to the invention in which the screen elements are arranged in two concentric annular zones $Z_1$ and $Z_2$ and are displaced about one half of their angular size, i.e. by ¼ of the screen constant. The individual sections are alternately completely impervious to light or completely light pervious. If light conducting fibers are arranged behind each light transmissive section, these light conducting fibers of each annular zone may be bundled and behind each one of these bundles may be arranged photoelectric receivers whose emitted signals are then phase displaced by 90°.

In this embodiment of the screen disc the light trace written by the electron beam on the fluorescent screen of the cathode ray tube must have a certain width so as to make sure that the two concentric annular zones $Z_1$ and $Z_2$ of the screen disc are simultaneously scanned. This may be achieved either by an electronically diffused projection or by letting the electron beam oscillate in radial direction. This radial oscillation may be effected in known manner by connecting additional alternating voltages to the deflecting systems of the cathode ray tube whose frequency compared with the circuling frequency of the electrom beam is very high.

A particular advantage of a screen of this type is that the phase displaced signals obtained may in known manner be processed for a counting of the interpolation steps which is correct with respect to their prefixes. With the screen illustrated in FIG. 3, however, it is merely possible to count the interpolation steps without taking into consideration the direction of movement of the scale.

Figure 5:
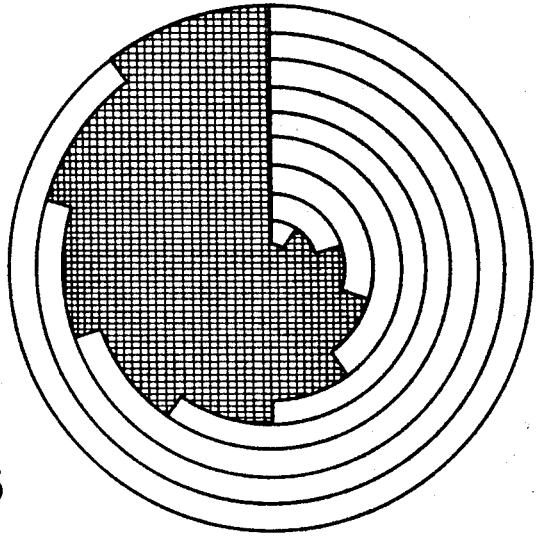
FIG. 5 is an elevation view of a coded screen disc.

FIG. 5 illustrates schematically a screen diaphragm coded 1 to 10. If this type of screen is used in conjunction with a simultaneously circulating electron beam which also oscillates radially at a high frequency, the photoelectric cell 12 according to FIG. 2 emits voltages which change with every step about the same unit value according to the increase of the light stream. If then, for example, there are connected Schmitt triggers to the load resistance 10 of FIG. 2, whereby the trigger levels are also graduated, this will produce voltages at the outputs which correspond in each instant position to the luminous trace on the screen plate.

It is further possible to project by means of light conducting filaments the light transmissive sections of the screen plate onto light sensitive receivers and to process their emitted signals in known manner.

Figure 6:
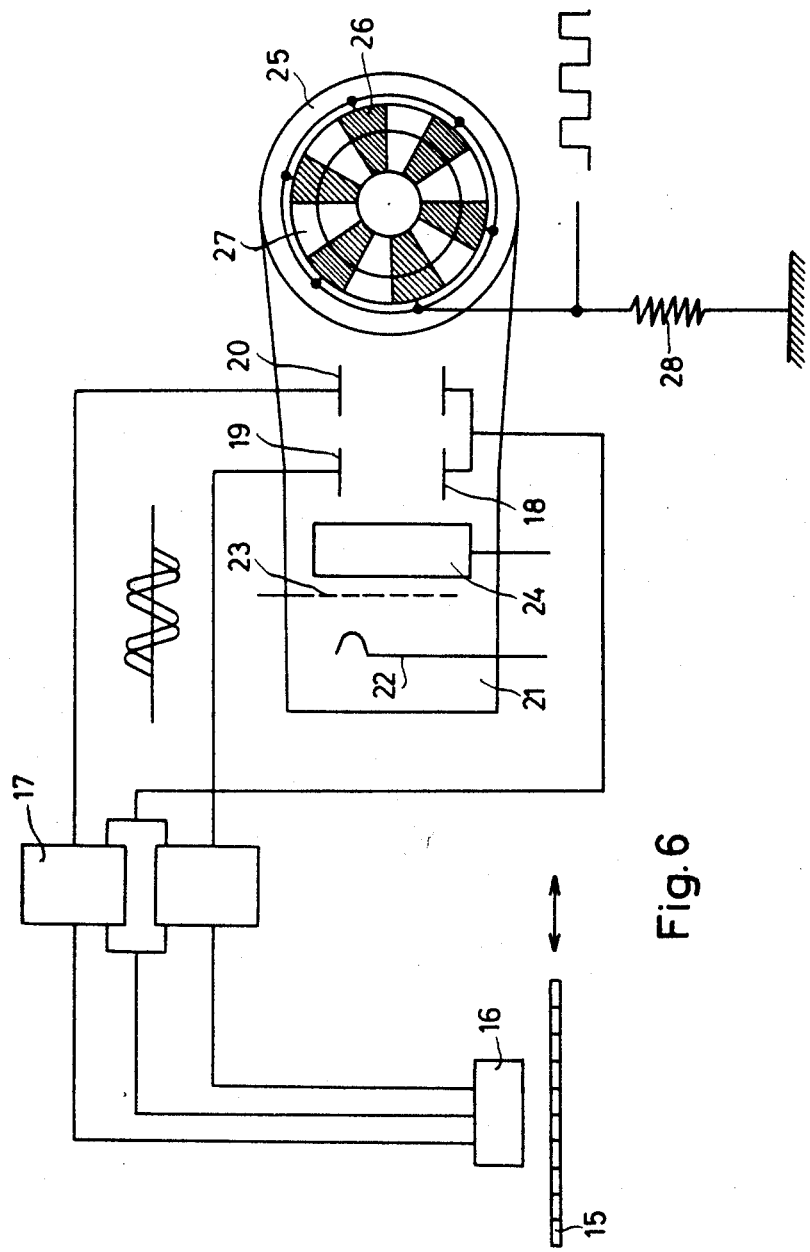
FIG. 6 illustrates diagrammatically the entire assembly of a device with a totally electrically operating screen.

FIG. 6 illustrates schematically an arrangement in which a sequence of conducting sections 26 and nonconducting sections 27 is provided within the cathode ray tube on the picture screen thereof. This is an arrangement which effects a subdivision of the circle performed by the electron beam purely by impulses so that each time the electron beam scans a metallic zone of the screen plate a voltage pulse at the resistance is produced. The laterally displaceable scale 15 is scanned by a transmitter 16, for example a photoelectric arrangement. The sine-shaped signals which are phase displaced by 90° and are amplified by the amplifier 17 are transferred to the deflecting plates 18, 19 and 20 of the cathode ray tube 21 having a cathode 22, a grid 23 and an anode 24. In circling the electron beam scans the screen arranged on the picture screen 25 of the cathode ray tube whose conducting sections 26 are connected among each other. The signals taken from the working resistance 28 have a well approximated rectangular shape as is illustrated in the drawing. They are counted by a device according to FIG. 2.

Figure 7:
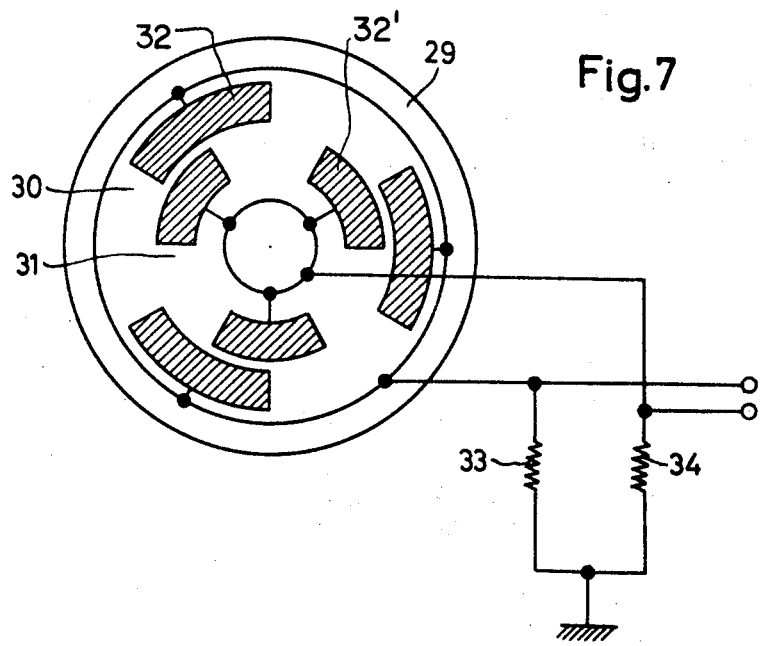
FIG. 7 illustrates diagrammatically a totally electrically operating screen having two annular zones with phase displaced screen elements.

FIG. 7 illustrates schematically a plan view of a luminous screen 29 of a cathode ray tube with a screen which is divided in two annular sections 30 and 31 and whose conducting sections 32, 32' are each offset from one another by one half angular width, i.e. by one quarter of the screen constant. The emitted signals are received by the two resistances 33 and 34 and serve for a prefix-correct impulse counting.

Figure 8:
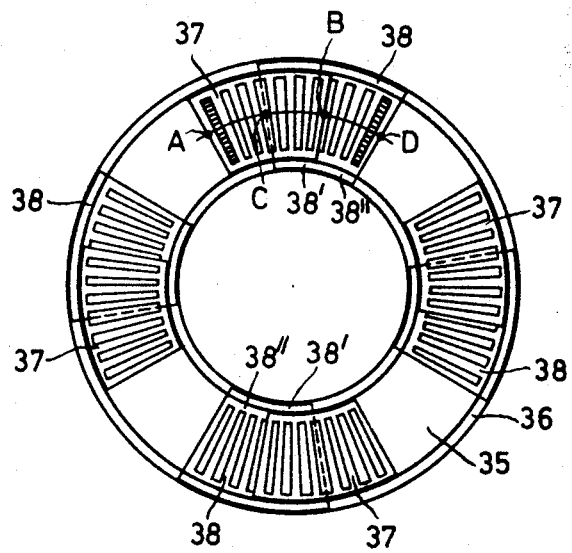
FIG. 8 illustrates diagrammatically two screen discs arranged one behind the other.

In FIG. 8 two screen discs 35 and 36 are superimposed. The disc 35 facing the electron beam is provided with screen diaphragms 37. The screen diaphragms permit about 50% of the impinging electron beam bundle to pass through. These penetrating electron beams strike the screen sections 38 which have the same dimension as the sections 37 but are offset from the sections 37 by one quarter of the screen constant. The sections 38 are made up of two groups 38' and 38" of which the group 38' is covered by a screen element 37. The portions 38' are constructed as complete screens. They receive the full 50% of the admitted 50% electron beam bundle. The portions 38" project beyond the screen elements 37 and are themselves constructed as a grid screen with a screening capacity of 50%. Consequently, each screen element 37 supplies a voltage pulse of rectangular shape when scanned by the electron beam from A to B, and each screen element 38 when scanned by the electron beam from C to D furnishes a correspondingly phase deflected voltage impulse. With this embodiment of the invention again a prefix-correct counting of the impulses is possible.

Figure 9:
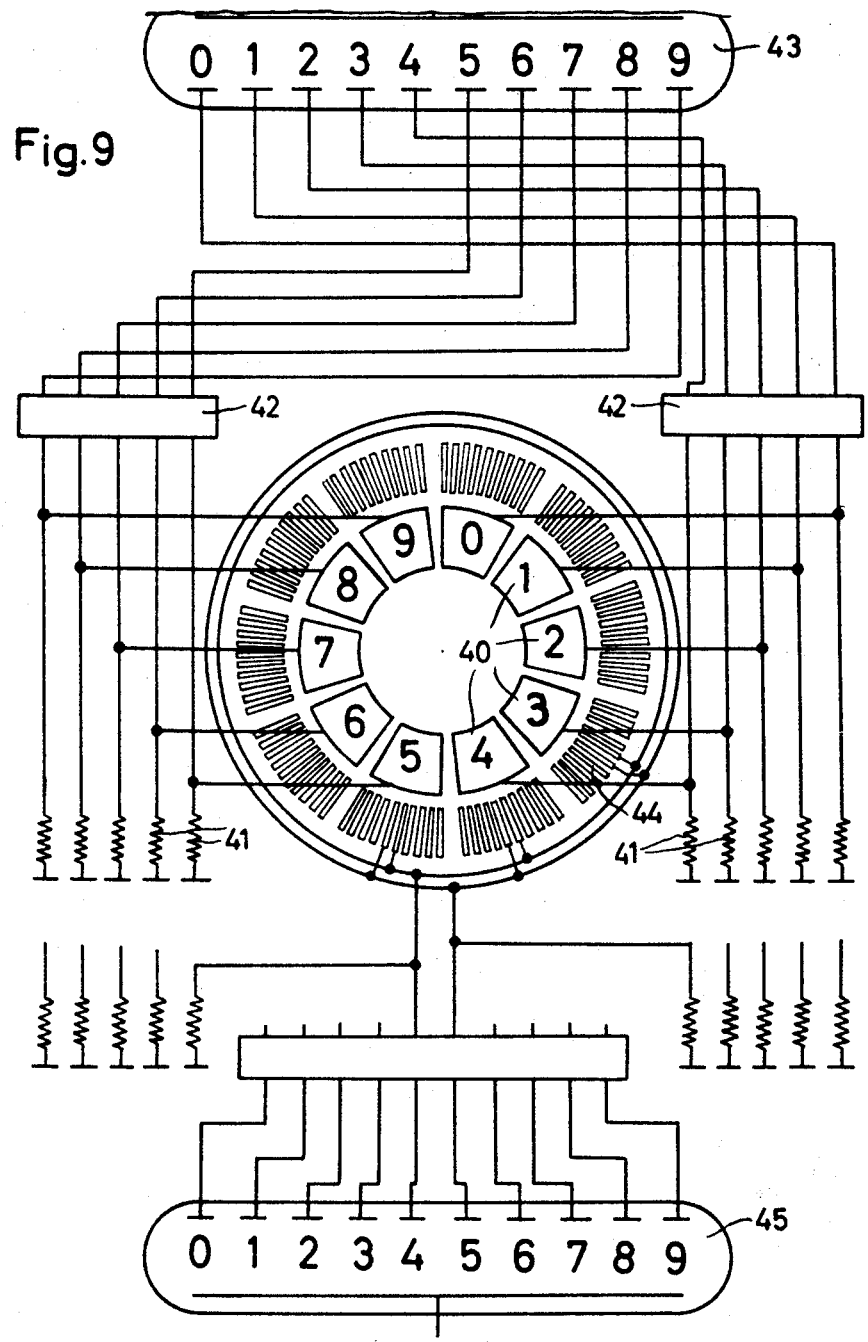
FIG. 9 illustrates diagrammatically a modified embodiment of the device of the invention.

According to FIG. 9, conducting screen elements 40 having the numbering 0 to 9 are arranged at a small distance from each other in an annular zone. Each element is connected with a resistance 41 which is grounded. If the electron beam strikes one of these elements, electric current flows to the ground whereby at the respective resistance a voltage pulse is generated which is amplified by amplifier 42, for instance comprising a number of transistor steps, and is subsequently directly applied to the cathodes of an associated number indicating tube 43. Each screen element 40 is associated with a cathode of the tube 43 so that depending on the position of the electron beam a number lights up. Additional conducting screen elements 44 are provided in a second annular zone. Each ten of such screen elements subdivide one element 40. The elements 44 are correspondingly connected with the cathodes of a number indicating tube 45. The screen elements 44 corresponding to the same number are short-circuited. Therefore, the elements 40 provide a ten-fold subdivision of the scale intervals, and the elements 44 a hundred-fold division. The difference between this arrangement and the ones described on the preceding pages is that the arrangement according to FIG. 9 indicates directly digital interval fractions, that is, without impulse counting. The elements 44 may also be arranged in rear of the elements 40 if the latter are constructed as grid screens according to FIG. 8.

The embodiment according to FIG. 10 employs two concentrically arranged grid screens 50 and 51 in which, however, the screening capacity is not constant as in FIG. 8, but varies according to a function in dependence of the polar angle of the electron beam. The voltages taken from working resistances are applied to the X and Y-deflecting plates of a cathode ray tube used for counting. The function curve of the screen diaphragm is so selected that the cathode ray of the tube again describes a circle. There are available a plurality of functions for solving this problem. The simplest one for the problem on hand is a function curve of sine $\mu$ for the screen 50 and of cosine $\mu$ for the screen 51 if $\mu$ is the polar angle. Since the grid screens can only generate voltage $\geq 0$, while the true sine and cosine curve also require negative voltages, either a zero displacement—which is conventional in oscillographs—has to be performed, or inversion steps which are known per se have to be interposed.

FIG. 10 shows that the sine and cosine functions repeat themselves ten times during one orbit of the electron beam. Consequently, the electron beam moves in the following tube ten times as fast as in the tube according to FIG. 10. This results in a ten-fold ratio, meaning that in the following tube—which for example may have a screen arrangement according to FIG. 9—at the scanning of a scale interval not 100 steps are counted, but 1000. Therefore, the path 44 of FIG. 9 would represent the $\frac{1}{1000}$ units and the path 40 of FIG. 9 would represent the $\frac{1}{100}$ units. In order to also receive the $\frac{1}{10}$ units, the transmission capacity of the screens 50 and 51 according to FIG. 10 may be utilized to control another screen, for instance one like the screen 40 of FIG. 9. This would provide the $\frac{1}{10}$ units. Such an additional screen may be omitted when the following cathode ray tube counts impulses, as has been described for example in connection with FIG. 4 and FIG. 6.

What we claim is:

1. In an interpolation device for the digital interpolation of measuring values which are supplied by a length or angle measuring instrument, a signal imparting device including means for producing two separate sinusoidal primary signals which are phase displaced about 90°, a cathode ray tube having a deflection system and a picture screen, means for amplifying said primary signals and feeding the same to said deflection system of said cathode ray tube, said deflection system being so arranged that the electron beam in said cathode ray tube rotates continuously once in a complete closed path during each signal period of said primary signals and produces an annular luminous image on said picture screen, screen means associated with said picture screen and composed of light transmissive and opaque zones for subdividing said annular image into discrete interpolation steps and secondary signals adapted to be used for digital indication.

2. An interpolation device according to claim 1, in which said screen means comprise at least one stationary screen disc provided with light transmitting and opaque screen elements, said screen disc being arranged on said picture screen of said cathode ray tube, and a photoelectric receiver energized by the image of the cathode ray trace produced on said picture screen.

3. An interpolation device according to claim 1, said screen means comprising a screen plate provided with radially arranged sector-shaped screen elements.

4. An interpolation device according to claim 1, in which at least one electrically conductive screen disc provided with screen elements is arranged within said cathode ray tube to be scanned by said electron beam, said screen comprising a plurality of alternate conductive and non-conductive sector-shaped screen elements, said conductive screen elements being connected with the cathodes of a number indicating cathode ray tube so as to illuminate the cathodes which are struck by the electron beam in said last named tube.

5. An interpolation device according to claim 1, in which at least one electrically conductive screen disc provided with screen elements is arranged within said cathode ray tube to be scanned by said electron beam.

6. An interpolation device according to claim 1, in which at least one electrically conductive screen disc provided with screen elements is arranged within said cathode ray tube to be scanned by said electron beam, said screen comprising a plurality of alternate conductive and non-conductive sector-shaped screen elements and grounded receiving means arranged in rear of said conductive screen elements and connected therewith.

7. An interpolation device according to claim 1, in which said screen means comprises a screen disc having two concentrically arranged annular zones of screen elements thereon, the screen elements in one zone being offset with respect to the screen elements in the other zone about a distance equal to one quarter of the screen constant.

8. An interpolation device according to claim 1, in which said screen means comprises a screen disc provided with screen elements arranged according to a predetermined code.

9. An interpolation device according to claim 1, in which said screen means comprises a plurality of screen discs arranged in axial alignment one behind the other, at least one of said screen discs being constructed as a grid screen.

10. An interpolation device according to claim 1, in which said screen means comprises a plurality of screen discs arranged in axial alignment one behind the other, said screen discs each having a difference screen constant.

11. An interpolation device according to claim 1, in which said screen means comprises a plurality of screen discs arranged in axial alignment one behind the other, said screen discs being each provided with a number of concentrically arranged rows of screen elements.

12. An interpolation device according to claim 1, in which said screen means comprises a plurality of screens of which at least one is a grid screen, said screen producing voltage gradients in dependence of the polar angle of the electron beam, said voltage gradients being applied to the deflecting plate of a cathode ray tube arranged in series with said first mentioned cathode ray tube.

13. An interpolation device according to claim 1, in which said screen means comprise two grid screens arranged in concentrically arranged annular zones.

References Cited

UNITED STATES PATENTS

| | | | |
|---|---|---|---|
| 2,689,314 | 9/1954 | Gunderson | 315—8.5 |
| 2,974,295 | 3/1961 | Rydbeck | 315—12 |
| 2,901,663 | 8/1959 | Nevius | 315—12 |

MAYNARD R. WILBUR, *Primary Examiner.*

W. J. KOPACZ, *Assistant Examiner.*